1,436,207

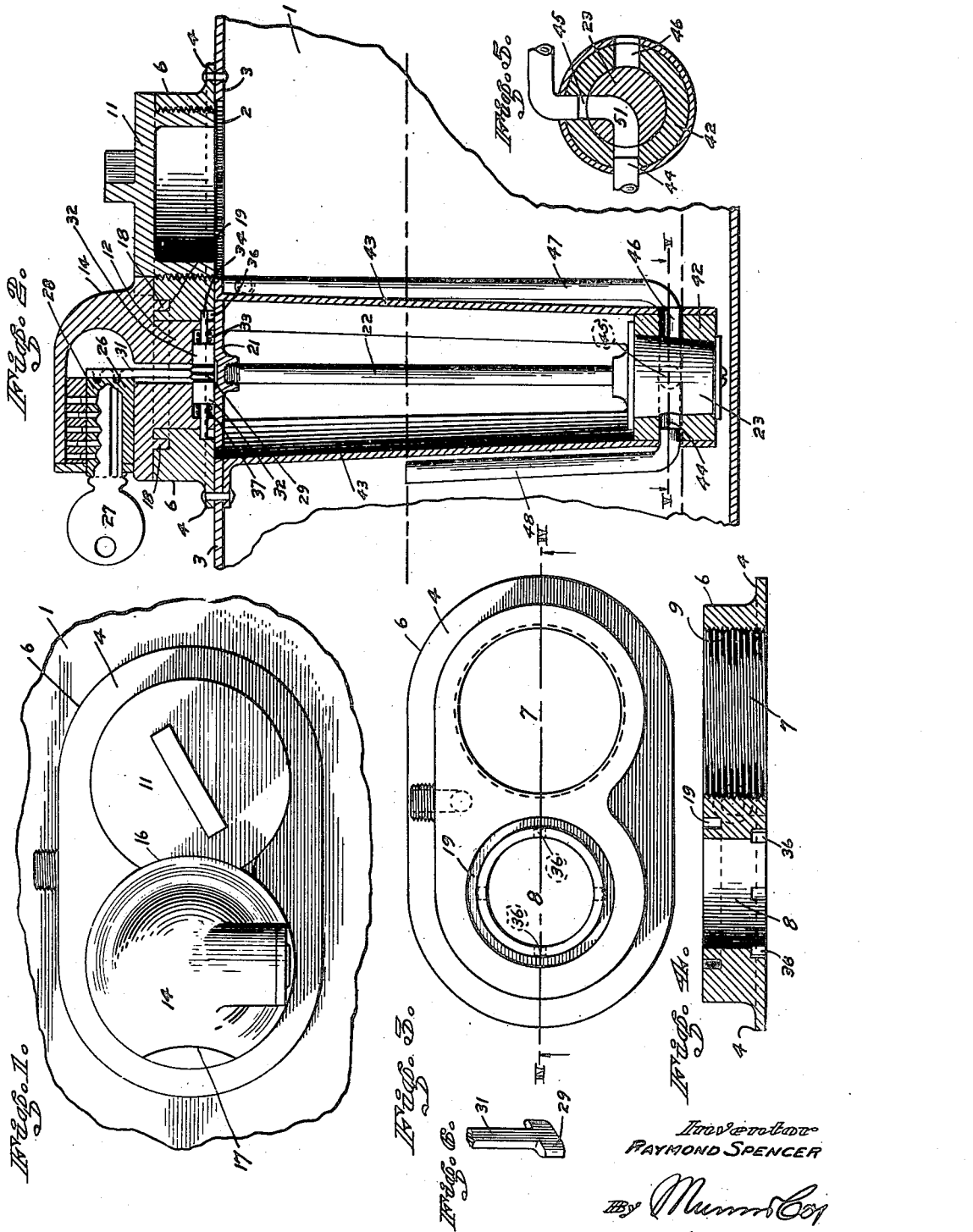
R. SPENCER.
LOCKING DEVICE.
APPLICATION FILED MAR. 29, 1921.
1,436,207.
Patented Nov. 21, 1922.
Inventor
RAYMOND SPENCER Patented Nov. 21, 1922.

UNITED STATES PATENT OFFICE.

RAYMOND SPENCER, OF WALNUT CREEK, CALIFORNIA.

LOCKING DEVICE.

Application filed March 29, 1921. Serial No. 456,763.

*To all whom it may concern:*

Be it known that I, RAYMOND SPENCER, a citizen of the United States, and resident of Walnut Creek, county of Contra Costa and State of California, have invented a new and useful Locking Device, of which the following is a specification.

The present invention relates to improvements in locking devices and more particularly in such locking devices as are adapted to selectively lock the inlet and the discharge of a liquid or gas containing tank. While I have designed my device with particular reference to the gasoline tank of an automobile I do not wish to be restricted to the same. The principal object of my invention is to provide a device, by which the discharge of the automobile tank can be selectively closed and opened and can be secured in either position by means of a lock requiring a special key to change its position. Thus the automobile can be made practically burglar proof, for when the owner has to leave it, he need only close the tank discharge and lock the same. Another object of my invention is to introduce a feature into this device that will automatically indicate to the driver when the supply of gasolene is getting low, in fact, that will force the driver when the gasolene reaches a certain level to change the position of a valve in the discharge before he can continue to drive. Another object of my device is the incorporation into the same of a locking device for the gasolene inlet so that the latter can only be opened by a person in possession of the key to the lock.

I attain these objects by means of the mechanism illustrated in the accompanying drawing, in which Figure 1 represents a plan view of my device shown attached to a gasoline tank, the latter being only partly shown, Figure 2 a vertical cross-section through my device, Figure 3 a plan view of a flanged supporting member for the operative portions of my device, Figure 4 a cross-section through said member along line 4—4 of Figure 3, Figure 5 a horizontal section through a valve forming part of my device, along 5—5 of Figure 2, and Figure 6 a perspective view of a rocking wedge used to lock and unlock my device.

Referring to the drawings in detail it will be seen that the gasoline tank 1, shown broken away in the drawing, is provided on top with an oblong hole (2), on the edges (3) of which fits the flange (4) of an oblong supporting member (6). Said member has two vertical perforations (7) and (8), the former threaded, as shown at (9), and adapted to receive the cap (11), while the latter has a smooth circular edge and is adapted to receive the reduced circular end (12) of a member (14), which is adapted to rotate in said hole. Since the latter member controls the valve forming part of my device, I shall refer to the same hereafter as the control (14). It will be seen from Figures 1 and 2, that the flanges of the cap (11) and the control overlap and that a recess (16) is provided in the flange of the cap to allow the control (14) to rotate when the two occupy the position indicated in Figure 1. In this position the cap is locked and cannot rotate. But another recess (17) is provided in the flange of the control, and it will be seen that the cap is free to rotate when its flange comes in contact with said recess. It will be noted that only one recess is provided in the control, so that there is only one position of the control that allows the cap to be unscrewed.

The body of the control (14) rests on the supporting member and a bearing is provided for the same by means of the projecting ring (18) engaging the annular groove (19). Fixed to the same so as to rotate with it, is the horizontal plate (21), which on its part supports the vertical rod (22), to the lower end of which the valve stem (23) is attached, so that said valve stem partakes of the rotating motion of the control (14).

The control is provided with a lock (26). The particular lock selected for the drawing is a Yale lock, but it is to be understood that any suitable lock will answer the purpose. In the lock the insertion of the key (27) allows the plug (28) to rotate and give circular motion to the wedge (29) at the end of the arm (31) attached to the plug. This wedge locks the control by forcing itself between two cylindrical bodies (32) adapted to reciprocate in opposite recesses (33) in the control. In forcing said cylinders apart it forces the plungers (34), projecting from the same in opposite directions, into recesses (36) within the supporting member (6). This is the position shown in Figure 2 and it will be readily seen that in this position the control cannot turn, it being locked against the supporting member (6). When the key turns the rotating plug, it will swing the wedge away from the two cylindrical bodies and the latter will be forced toward each other by means of the springs (37). In the latter positions the plungers (34) will clear the supporting member and the control is now free to rotate.

In Figures 3 and 4 I have indicated four recesses (36) as locking means for the control, which means that the control can be locked in four different places. I have shown them as occupying the four corners of a square within the circumference but do not wish to bind myself to this way of grouping the recesses, since in practice a different location of the four recesses might appear more desirable.

The valve stem (23) previously mentioned fits into the valve housing (42) and is adapted to be rotated within the same by the control (14). The housing is disposed near the bottom of the tank and is supported from the top by two vertical members (43). It will be seen that the housing is provided with three ports, (44), (45), and (46). The port (45), being at the far side in Figure 2, is connected to the discharge pipe (47), which extends through the top of the tank and is led from there to the carburetor. Where the gasoline is fed to the carburetor by gravity, the pipe (47), of course, should extend downwardly from the valve.

The ports (44) and (46) are inlet ports, one opening into the tank directly, while the other is connected to a pipe (48) which extends upwardly some distance, the object being that ordinarily the pipe connection is to be used for an inlet, but when the level of the gasoline gets so low, that it won't feed the pipe any more, then the driver can fall back on the other inlet which will supply enough additional gasoline to take him to a supply station.

The valve stem is provided with an elbow-shaped passage (51) adapted to simultaneously register with either of the inlets in combination with the discharge. In Figure (5) it registers with inlet (44) and discharge (45) and if given a quarter turn to the right, it would register with the discharge (45) and the inlet (46). Another quarter turn would make it inoperative, since it would register with inlet (46) only. Neither would a fourth turn make it operative, since then it would register with (44) only.

Thus there are four different combinations possible in the operation of my device. In the position shown in the drawing throughout the several figures the cap is locked and the carburetor is fed through the pipe (48). This is the normal position when the car is in motion, and to change this condition, the key has to be used. Assuming that the gasoline supply runs low and none can be obtaind through the pipe (48), the driver will insert his key, thereby unlock the control, give the control a quarter of a turn, when the springs (37) will automatically lock the control again. In this second combination the cap is still locked, but the valve stem has been turned so that its passage will admit gasoline to the discharge through inlet (46) and in this manner the remaining quantity of gasoline can be used up. The third combination will bring the recess (17) in the flange of the control in contact with the cap and will allow the latter to turn, so that the cap may be unscrewed. In this position the valve stem will be turned so far that its passage does not register with the discharge pipe, so that no gasoline will flow from the tank to the carburetor. In the fourth combination the cap will be locked again and the passage in the valve stem does not register with the discharge pipe so that no gasoline will flow. This will be the combination to be selected by the driver when he wishes to leave the car.

Thus it will be seen that my device enables the driver to selectively draw on the gasoline supply at a point well above the bottom of the tank, at a point near the bottom, the cap being locked at both times, to unscrew the cap while the gasoline feed is stopped and to lock the cap and the gasoline feed simultaneously, and that it further enables him to lock the device in each of the positions so that it takes a special key to change the combination.

I claim:

1. For a tank of the character described, a cap and a valve control mounted in operative proximity in interlocking relation, a recess in either allowing of rotary motion of the other.

2. For a tank of the character described, a circular cap and a circular valve control mounted in operative proximity in interlocking relation, an arc shaped recess in either allowing of rotary motion of the other.

3. For a tank of the character described, a cap and a valve control mounted in operative proximity in interlocking relation, a recess in either allowing of rotary motion of the other and means for selectively locking the valve control in a plurality of positions.

4. For a tank of the character described, a cap and a valve control mounted in operative proximity in interlocking relation, a recess in either allowing of rotary motion of the other and means for selectively locking the valve control in a plurality of positions comprising a bearing member having a plurality of recesses therein and a plunger associated with the valve control adapted to engage any one of these recesses.

5. For a tank of the character described, a cap and a valve control mounted in operative proximity in interlocking relation, a recess in either allowing of rotary motion of the other and means for selectively locking the valve control in a plurality of positions comprising a bearing member having a plurality of recesses therein, a pair of plungers associated with the valve control and key controlled means for engaging the plungers with the recesses.

RAYMOND SPENCER.